United States Patent [19]

Bonewald et al.

[11] Patent Number: 5,553,755
[45] Date of Patent: Sep. 10, 1996

[54] WHIPPED CREAM DISPENSER

[75] Inventors: Chris Bonewald, New London; Robert A. Coerver, Bedford, both of N.H.

[73] Assignee: Summit Packaging Systems, Inc., Manchester, N.H.

[21] Appl. No.: 489,121

[22] Filed: Jun. 9, 1995

[51] Int. Cl.$^6$ .................................................. B65D 83/14
[52] U.S. Cl. .................. 222/402.21; 222/402.23; 239/579
[58] Field of Search ................ 222/402.11, 402.21, 222/402.22, 402.23, 402.24, 518, 542, 570; 239/337, 498, 579

[56] References Cited

U.S. PATENT DOCUMENTS

| | | | |
|---|---|---|---|
| 2,704,622 | 3/1955 | Soffer | 222/402.22 |
| 2,945,494 | 7/1960 | Bowen | 222/402.22 |
| 2,957,610 | 10/1960 | Michel . | |
| 2,975,944 | 3/1961 | Michel . | |
| 2,992,760 | 7/1961 | Turk . | |
| 3,158,298 | 11/1964 | Briechle | 222/402.24 |
| 3,300,105 | 1/1967 | Rosen | 222/402.23 |
| 3,434,633 | 3/1969 | Green . | |
| 3,722,760 | 3/1973 | Hug . | |
| 3,758,007 | 9/1973 | Rosen . | |
| 3,954,208 | 3/1976 | Brill . | |
| 4,436,229 | 3/1984 | Beard | 222/402.21 |
| 4,856,684 | 8/1989 | Gerstung . | |
| 4,958,755 | 9/1990 | Gerstung . | |

*Primary Examiner*—Andres Kashnikow
*Assistant Examiner*—Philippe Derghshani
*Attorney, Agent, or Firm*—Dallett Hoopes

[57] ABSTRACT

In a whipped cream dispenser incorporating a tilt-type aerosol valve the tubular actuator has at its base a downwardly facing annular shoulder. This shoulder, by butting against the metal of the valve pedestal, prevents further tilting and further stress on the tubular valve spout. Further, ribs on the stem and actuator keep the actuator in fully installed position on the valve stem.

4 Claims, 1 Drawing Sheet

5,553,755

WHIPPED CREAM DISPENSER

BACKGROUND OF THE INVENTION

This invention relates to whipped cream dispensers. More specifically, this invention relates to a whipped cream dispenser comprising an aerosol-type container having a discharge valve which is opened by tilting the valve spout, and it includes means to limit the tilting of the spout and relieving stress on the stem.

Since at least the 1950's there have been patents disclosing pressurized containers for whipped cream in which a flexible spout is mounted in the opening of the container. The spout receives the stem of a relatively rigid valve element which terminates downwardly in a valve head normally seating in the inlet of the spout. In operation, the container is inverted and the spout is tipped causing the stem to unseat the valve head, permitting discharge. The stem often includes a deflector for assisting in foaming and guiding the fluid to an expansion chamber in the spout and frequently the upper end of the spout has inwardly curving petals presenting a "tulip" top to focus the discharge and reduce spattering.

Examples of such structure are:

U.S. Pat. Nos. 2,957,610 Michel; 3,722,760 Hug; 2,975,944 Michel; 3,758,007 Rosen; 2,992,760 Turk; 4,958,755 Gerstung.

The above described arrangement in more or less similar embodiments has been used for years. At the same time, aerosol valves typified by structures used in dispensing hair spray and deodorants have taken a different form wherein a plastic valve body is mounted in a pedestal on a metal mounting cup, the valve body containing a tilt-type valve element having a tubular stem extending upwardly through a sealing gasket and an opening in the mounting cup. Such structures are typified by the old Briechle U.S. Pat. No. 3,158,298 issued Nov. 24, 1964.

It has been found relatively recently that tilt-type aerosol valves can be used for whipped cream provided they are fitted with a whipped cream actuator spout which telescopes onto the tubular valve stem. The actuator has contained a stationary deflector element and has been formed with a tulip upper end.

One of the serious drawbacks of earlier embodiments of whipped cream dispensers using tilt-type aerosol valves described above has been stem breakage. Inherent in the use of the actuator as an extension of the aerosol stem is that considerable leverage is developed which places an inordinant stress on the fragile stem. Such stems usually of plastic such as an acetal have an outside diameter of 0.155" with a wall thickness of only 0.018 inch. As a result, whipped cream dispensers using tilt-type valves have failed, snapping off at the stem just above the gasket.

It is an object of the present invention to limit the tilting of the discharge actuator and reduce the stress on the stem in such a combination. The limit is effected by asserting a positive stop relationship between the actuator and the metal pedestal of the mounting cup.

SUMMARY OF THE INVENTION

Therefore, the invention in such a tilt-type whipped cream dispenser incorporating a tilt-type aerosol valve is the improvement wherein the tubular actuator has at its base a downwardly facing annular shoulder. This shoulder, upon butting against the metal of the valve pedestal, prevents further tilting and further stress on the tubular valve stem.

Further, the improvement includes retaining means to keep the actuator in proper "home" position on the valve stem, precluding any upward "creeping" of the actuator with respect to the stem which would increase the distance of the shoulder from the mounting cup and defeat the stop action. In the preferred embodiment the retaining means includes an outward peripheral rib on the stem and an inward rib on the actuator which, in installation, snap past each other immediately proximate the "home" position.

BRIEF DESCRIPTION OF THE DRAWINGS

Further objects and features of the invention will be apparent to those skilled in the art from a study of the following specification and the accompanying drawings, all of which disclose a non-limiting embodiment of the invention. In the drawings.

DESCRIPTION OF THE PREFERRED EMBODIMENT

Figure 1:
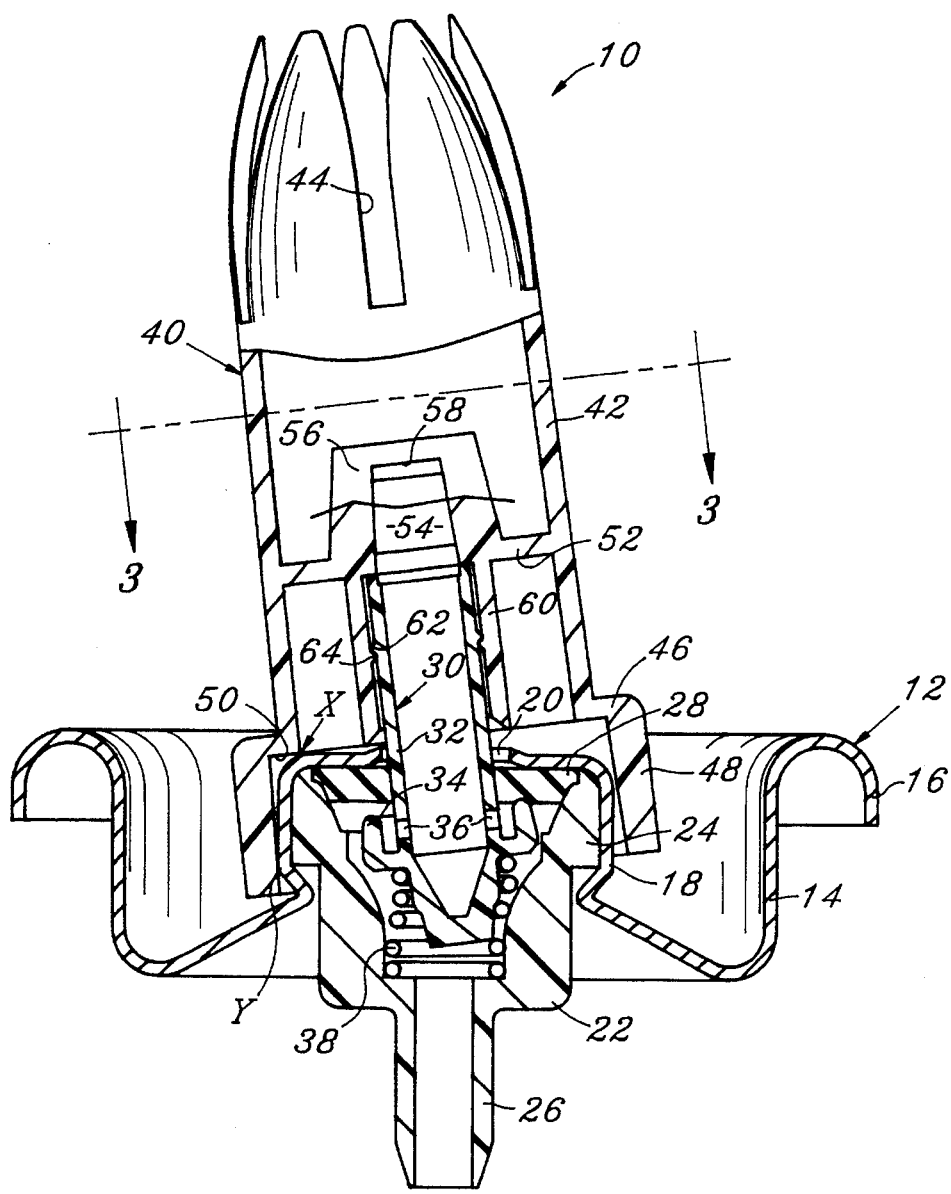
FIG. 1 is an elevational view partly in section taken on the center line of the dispensing assembly including the tilt-type aerosol valve and the tubular whipped cream actuator, both shown in tilted condition.

A dispensing assembly is shown in FIG. 1 and is generally designated 10. It comprises the valve assembly 12 defined by the usual mounting cup 14 having a peripheral curl 16 by which it is mounted on the top of its can (not shown).

As is well known, the cup, which may have a protective sealing laminate on its underside, is centrally formed with a pedestal 18 having a central stem opening 20. The lower end of the pedestal is crimped inward to secure the valve body 22 of Nylon or other plastic.

The upper end of the body includes an outward flange 24 by which it is gripped by the pedestal. The lower end includes a tailpiece 26, and an annular gasket 28 sealingly closes off the top of the valve body. A valve element 30 is provided with a tubular stem 32 which extends sealingly through the gasket 28. The lower end of the stem is formed with an annular upward sealing lip 34, and the usual pierced discharge port 36 permits flow when the valve is "open". A spring 38 urges the valve element upward to sealing position.

The whipped cream actuator 40 may be molded of polypropylene. It includes a general tubular body 42 having at its open upper end peripherally spaced slots 44 with inwardly curving petals inbetween to form a "tulip" top. The lower end is formed with an outward flange 46 and a downward skirt 48. The underside of the flange 46 (FIG. 2) is formed with a downwardly facing annular stop shoulder 50.

The inside of the skirt 48 is tapered, generally complementing the shape of the valve pedestal, spaced therefrom and extending down far enough to hide it from view for aesthetic reasons. Intermediate the ends of the actuator 40 is a transverse support partition 52 which is unitary with the actuator and extends inward to a central passage 54.

Figure 3:
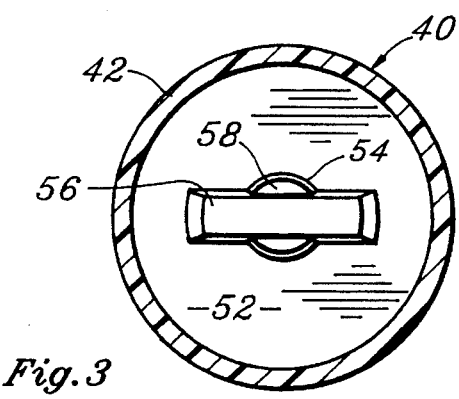
FIG. 3 is a sectional view taken on the line 3—3 of FIG. 1.

Extending upward on either side of the passage 54 is the inverted U-shaped bridge 56, the sides of which are open and the top of which is formed with a circular deflector 58 (FIG. 3) which aligns generally with the passage 54 to assist in the foaming of the whipped cream and direct it outward through the open sides of the bridge. Beneath the partition 52 there is formed a unitary central nipple 60 which, as shown, telescopes over the tubular stem 30.

Figure 2:
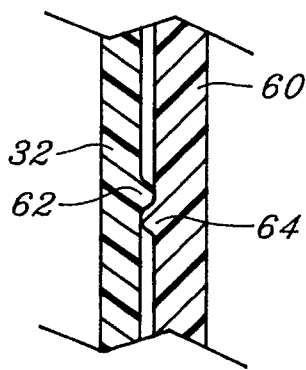
FIG. 2 is a greatly enlarged view of a portion of FIG. 1 showing the/retaining means for the actuator.

As best shown in FIG. 2, retaining means are provided on the stem and nipple to keep the actuator in "home" position wherein the upper end of the valve stem 32 engages the lower surface of the partition 52. More specifically, the retaining means comprises an outward peripheral rib 62 on the stem and an inward rib 64 on the actuator. Thus in assembly the actuator is telescoped over the stem and there is a definite "snap" as the ribs 62, 64 pass each other, indicating retaining engagement and the arrival of the actuator at the "home" position.

With the actuator installed on the container as described, the operation is similar to the operation of prior whipped cream dispensers on tilt-type aerosol valves. The container is inverted and liquid enters the body 22 through the tailpiece 26 and other openings in the bottom (not shown), the compressed propellent gas being now located above the liquid. When, with index finger, the user tilts the actuator 40 as shown (FIG. 1) the sealing ring 34 moves away from the gasket 28 permitting liquid to pass thereinside, through the port 36, down the inverted stem 32 into the actuator impacting on deflector 58, out the sides of the bridge 56 to expand in the chamber above the bridge and increase the foaming. Whipped cream is dispensed out the open end of the actuator.

As explained, a limit to the tilting is defined when the downward shoulder 50 hits the top of the pedestal 18 as shown in FIG. 1 at X. This absorbs any further force on the actuator exerted by the user and takes the brunt of the stress otherwise solely borne by the stem 32. As a result, the assembly is able to withstand excessive tilting force exerted by the user which would otherwise fracture the fragile stem 32. In addition, the lower end of the skirt 48 may contact the lower end of the pedestal 18 as at Y just above the crimp to help impede further tilting.

The function of the retaining means 62, 64 is important in that the upward "creeping" of the actuator on the stem 32 would cause the shoulder 50 to rise with respect to the mounting cup 18. This would mean that the stop shoulder 50, during the operation of the valve, would be too high with the result that the shoulder would not engage the mounting cup 18 and there would be no stop action. Thus, the effectiveness of the structure depends on both the retaining means 62, 64 and the stop means 18, 50. The secondary contact of the skirt at Y might also not be made.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. In a whipped cream dispenser comprising:

a. an aerosol container having at its upper end a tilt-type valve disposed in a metal valve pedestal having a side and a top and a central aperture receiving an upwardly directed tubular discharge stem, and the container enclosing a whipped-cream-producing product and propellant means, b. a unitary tubular whipped-cream actuator molded of rigid plastic and defined by an outer tubular body including a base end with an outward skirt disposed over the valve pedestal and a discharge end having spaced fingers, a support partition in the body intermediate the ends of the body formed with a central passage having a downward tubular nipple surrounding and fitting snugly over the aerosol discharge stem, and an inverted U-shaped bridge having a bight and legs bestriding the passage and unitary with the partition, the bight of the inverted U-shaped bridge being spaced from the central passage and comprising deflector means confronting the passage, the improvement wherein the skirt is defined by a short rigid radial outward flange having a downwardly facing shoulder and a generally downward annular wall following and surrounding the pedestal, the shoulder being adapted during dispensing to engage the top of the pedestal at a point of engagement when the actuator and valve stem are tipped, the point of engagement serving as a stop to limit further tilting of the actuator to avoid breaking of the stem.

2. A whipped cream dispenser as claimed in claim 1 including further retaining means to hold the acuator fully installed on the stem.

3. A whipped cream dispenser as claimed in claim 2 wherein the retaining means comprises an inward annular rib on the actuator and an outward peripheral rib on the stem proximate and above the rib on the actuator, the ribs together retaining the actuator fully installed on the stem.

4. A whipped cream dispenser as claimed in claim 2 wherein the actuator is tilted, the lower end of the skirt also engages the side of the pedestal to impede further tilting.

\* \* \* \* \*